United States Patent
Nogi

(12) 
(10) Patent No.: US 8,167,108 B2
(45) Date of Patent: May 1, 2012

(54) CLUTCH, CONTINUOUSLY VARIABLE TRANSMISSION, ENGINE UNIT INCLUDING THEM, AND STRADDLE-TYPE VEHICLE INCLUDING THEM

(75) Inventor: Sadao Nogi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 903 days.

(21) Appl. No.: 12/193,983

(22) Filed: Aug. 19, 2008

(65) Prior Publication Data

US 2009/0054181 A1      Feb. 26, 2009

(30) Foreign Application Priority Data

Aug. 20, 2007  (JP) ................................. 2007-214110
Jul. 22, 2008   (JP) ................................. 2008-188751

(51) Int. Cl.
*F16F 15/00* (2006.01)
*F16D 43/10* (2006.01)
(52) U.S. Cl. ................................ 192/110 R; 192/105 B
(58) Field of Classification Search ............... 192/105 B
See application file for complete search history.

(56) References Cited

U.S. PATENT DOCUMENTS

| | | | | |
|---|---|---|---|---|
| 1,969,993 A | * | 8/1934 | Schmidt | 192/70.27 |
| 1,976,925 A | * | 10/1934 | Chryst | 192/105 B |
| 2,230,520 A | * | 2/1941 | Wemp | 192/110 R |
| 2,395,308 A | * | 2/1946 | Wemp | 192/103 F |
| 3,444,749 A | | 5/1969 | Ruprecht et al. | |
| 3,762,519 A | * | 10/1973 | Bentley | 192/105 B |
| 4,069,905 A | | 1/1978 | de Gennes | |
| 4,605,386 A | | 8/1986 | Harris | |
| 5,906,258 A | * | 5/1999 | Kimura et al. | 192/110 R |

FOREIGN PATENT DOCUMENTS

| | | |
|---|---|---|
| DE | 10225991 A1 | 12/2003 |
| EP | 1201535 A2 | 5/2002 |
| EP | 1798395 A1 | 6/2007 |
| FR | 2835300 A1 | 8/2003 |
| GB | 1179253 A | 1/1970 |
| GB | 2145171 A | 3/1985 |
| GB | 2250069 A | 5/1992 |
| JP | 62288744 A | 12/1987 |
| JP | 63007725 A | 1/1988 |
| JP | 63-007725 | 3/1988 |
| WO | 03106854 A1 | 12/2003 |

OTHER PUBLICATIONS

European search report for corresponding European application 08014782 lists the references above, Jul. 28, 2009.

* cited by examiner

*Primary Examiner* — Rodney Bonck
(74) *Attorney, Agent, or Firm* — Keating & Bennett, LLP

(57) ABSTRACT

A clutch includes a clutch inner and a clutch outer that houses the clutch inner and that transmits or interrupts torque between itself and the clutch inner. The clutch outer has a thick portion that has a larger thickness than the other portions of the clutch outer. A position-of-center-of-gravity adjusting portion for bringing the center of gravity of the clutch close to the axial center of a driven shaft is formed at a position separate from the axial center of the driven shaft of the thick portion. Efficiency of manufacture work of bringing the position of the center of gravity close to the center of rotation is thereby enhanced.

3 Claims, 15 Drawing Sheets

CLUTCH, CONTINUOUSLY VARIABLE TRANSMISSION, ENGINE UNIT INCLUDING THEM, AND STRADDLE-TYPE VEHICLE INCLUDING THEM

RELATED APPLICATIONS

This application claims the benefit of priority under 35 USC 119 of Japanese patent application no. 2007-214110, filed on Aug. 20, 2007, and Japanese patent application no. 2008-188751, filed on Jul. 22, 2008, which are hereby incorporated by reference.

BACKGROUND OF THE INVENTION

1. Field of the Invention

The present invention relates to a continuously variable transmission of a straddle-type vehicle, and in particular, to a technology for adjusting the position of the center of gravity of a clutch.

2. Description of Related Art

Some straddle-type vehicles such as motorcycles have a clutch for transmitting or interrupting torque to a rear wheel and a continuously variable transmission for continuously varying a speed change ratio. When a belt-type continuously variable transmission is operated, a pulley around which a belt is wound is rotated around a shaft by the torque of an engine. Some clutches include a clutch inner and a clutch outer for housing the clutch inner and transmit or interrupt torque between the clutch inner and outer.

A member rotating around a shaft such as a clutch and a pulley may have a center of gravity shifted from the center of rotation by a manufacture error, which causes vibration and degrades the ride comfort of the vehicle. To bring the position of the center of gravity of the member close to the center of rotation, a technology for manufacturing a portion of the member is proposed in the related art. See, for example, Japanese Examined Utility Model Publication No. 63-7725.

However, in the related art, the manufacturing work for bringing the position of the center of gravity close to the center of rotation decreases manufacturing efficiency. For example, in a case where a member is small in size, such as in a clutch or continuously variable transmission for a small motorcycle, the manufacturing range in a clutch or a pulley also becomes small. Hence, when the position of the center of gravity is greatly shifted from the center of rotation by a manufacture error, the member itself needs to be replaced. Moreover, when the work of adjusting the position of the center of gravity is performed in the state that the pulley of the continuously variable transmission is mounted in an engine unit, it is difficult to perform manufacturing work because the pulley is positioned inside in a vehicle width direction (near the center of a shaft).

SUMMARY OF THE INVENTION

The addresses these problems and provides a clutch and a continuously variable transmission that enhances efficiency of the manufacturing work of bringing the position of the center of gravity close to the center of rotation.

A clutch according to the present invention includes a clutch inner mounted to be rotated around a shaft and a clutch outer mounted to be rotated around the shaft that houses the clutch inner and that transmits or interrupts torque between itself and the clutch inner. The clutch outer has a thick portion formed thereon that has a larger thickness than other portions of the clutch outer, and has a position-of-center-or-gravity adjusting portion formed at a position separate from an axial center of the shaft of the thick portion. The position-of-center-of-gravity adjusting portion brings the center of gravity of the clutch close to the axial center of the shaft.

According to the clutch of the present invention, the manufacturing work of bringing the position of the center of gravity of the clutch close to its center of rotation is easily performed. The position-of-center-of-gravity adjusting portion is formed in the thick portion having a large thickness, so that a portion that can be used for bringing the position of the center of gravity of the clutch close to the center of rotation is increased. Thus, even when the position of the center of gravity of the clutch is greatly shifted from the center of rotation, the clutch itself does not need to be replaced and hence the efficiency of the manufacture work is enhanced.

Moreover, a continuously variable transmission according to the present invention includes a pair of sheaves facing each other and around which a belt for transmitting engine torque is looped and which are rotated around a shaft. A rotary member is arranged on the shaft and is rotated with the sheaves. The rotary member is arranged outside in a vehicle width direction of the sheaves and has a position-of-center-of-gravity adjusting part fitted at a position separate in a radial direction from an axial center of the shaft. The position-of-center-of-gravity adjusting part brings the center of gravity of the sheaves and the rotary member close to the axial center of the shaft.

According to the continuously variable transmission of the present invention, the work of bringing the position of the center of gravity of the continuously variable transmission close to the center of rotation is easily performed. The rotary member having the position-of-center-of-gravity adjusting part fitted therein is positioned outside in the vehicle width direction of the pair of sheaves, that is, on the side close to a worker. For this reason, even in a state where the sheaves are mounted on the shaft, the work of bringing the position of the center of gravity close to the center of rotation is easily performed.

An engine unit according to the present invention includes the clutch or the continuously variable transmission. Still further, a straddle-type vehicle according to the present invention includes the engine unit.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Figure 1:
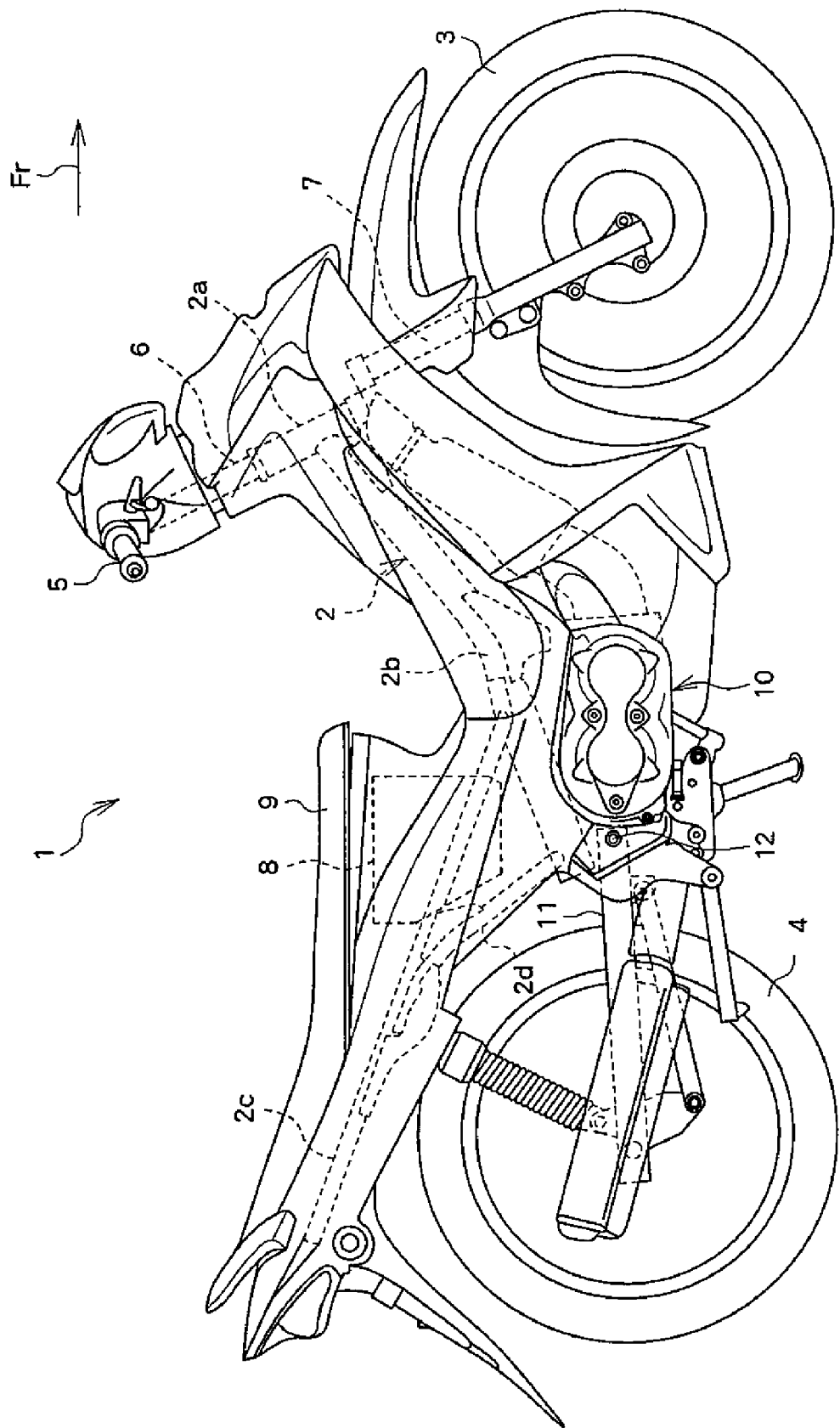
FIG. 1 is a side view of a motorcycle mounted with an engine unit including a clutch and a continuously variable transmission according to an embodiment of the present invention.
Figure 2:
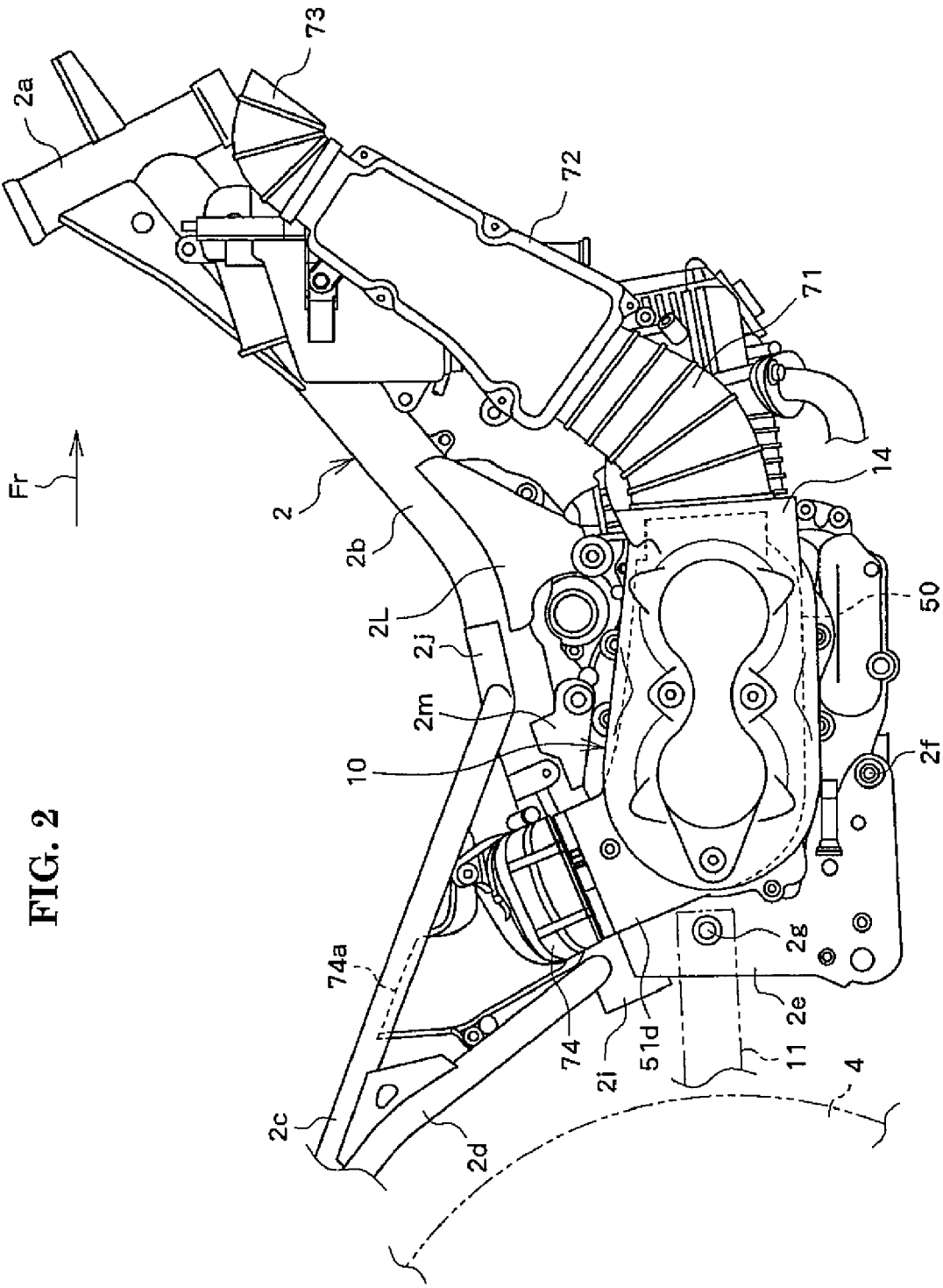
FIG. 2 is a side view of the engine unit and a vehicle body frame.
Figure 3:
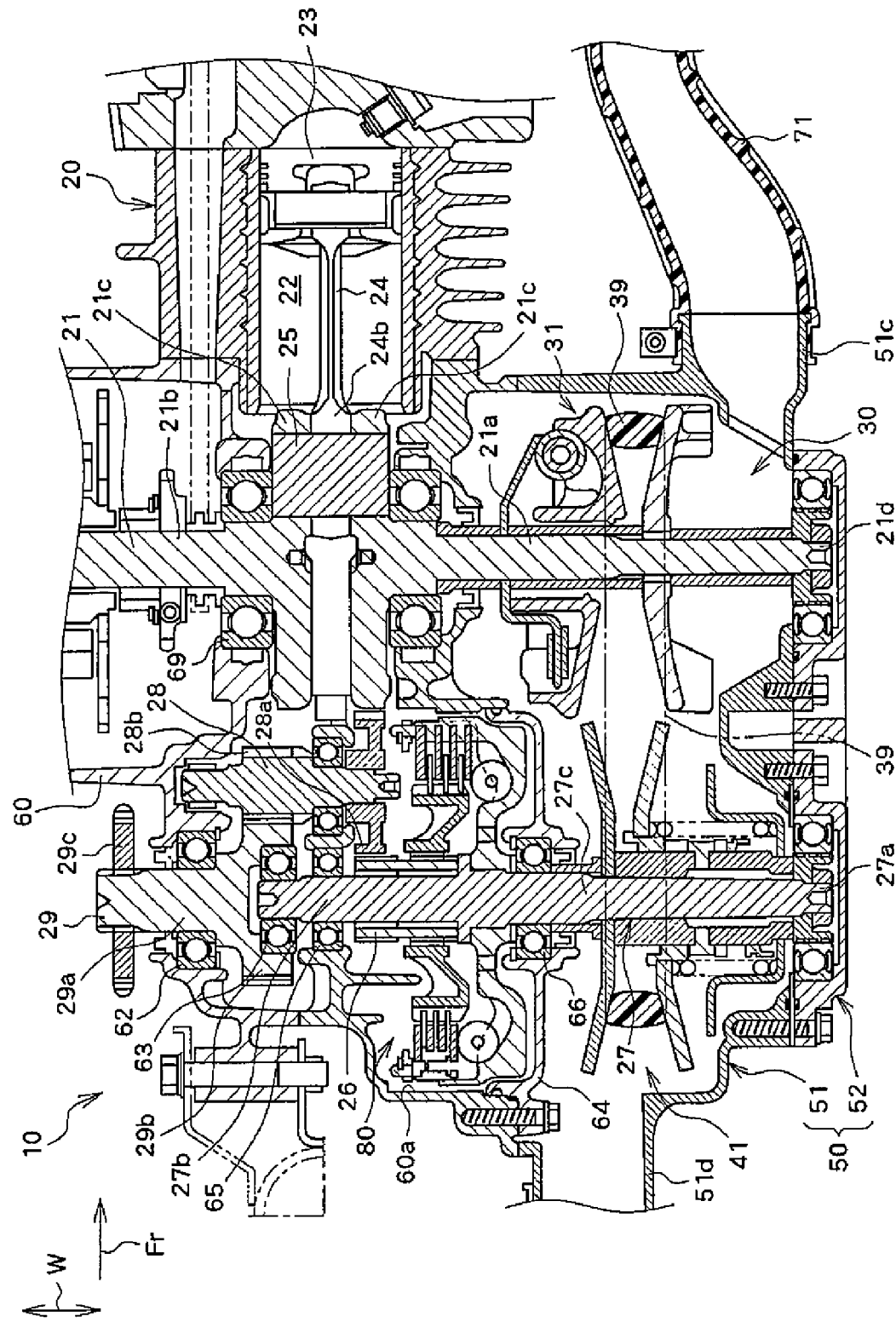
FIG. 3 is a sectional view of the engine unit.

An embodiment of the present invention is now described with reference to the drawings, FIG. 1 is a side view of a motorcycle 1 mounted with an engine unit 10 including a continuously variable transmission 30 and a clutch 80 that are examples of an embodiment of the present invention. FIG. 2 is a side view of a vehicle body frame 2 and engine unit 10 of motorcycle 1. FIG. 3 is a section view of engine unit 10.

As shown in FIG. 1, motorcycle 1 includes engine unit 10 and vehicle body frame 2. Moreover, as shown in FIG. 2, vehicle body frame 2 includes a steering head 2a, a main frame 2b, a seat rail 2c, a stay 2d and a bracket 2e.

Steering head 2a is fixed to the front end portion of vehicle body frame 2 and rotatably supports a steering shaft 6. Steering shaft 6 has a handlebar 5 connected to its top end portion and a front fork 7 connected to its bottom end portion. The bottom end portion of front fork 7 supports a front wheel 3.

As shown in FIG. 2, the front end portion of main frame 2b is connected to steering head 2a. Main frame 2b slants downward toward the rear portion of a vehicle body from its front end portion, and its rear (bottom) end portion 2i is positioned in front of a rear wheel 4. A front end portion 2j of seat rail 2c is connected to a middle portion of main frame 2b. Seat rail 2c slants upward toward the rear portion of the vehicle body from its front end portion 2j. A storage case 8 and a seat 9 are arranged above and supported by seat rail 2c (FIG. 1). Main frame 2b has the front end portion of stay 2d connected to its rear end portion 2i, and stay 2d slants upward from its front end portion, and its top end portion is connected to a middle portion of seat rail 2c. Bracket 2e extends downward and is formed in the shape of a plate and has its top edge portion joined to rear end portion 2i of main frame 2b.

Bracket 2e has a support part 2g fixed to its upper portion that supports a pivot shaft 12 (FIG. 1). The front end portion of a rear arm 11 is fixed to pivot shaft 12. A rear end portion of rear arm 11 supports the axle of rear wheel 4. Rear arm 11 and rear wheel 4 swing with pivot shaft 12 as a pivot independently of engine unit 10.

As shown in FIG. 2, engine unit 10 is fixed to a portion 2f on the front side of a bottom end portion of bracket 2e. Brackets 2L, 2m protrude downward and are joined to the middle portion of main frame 2b. The top wall on the front side of a crankcase 60 of engine unit 10 is fixed to bracket 2L, the top wall on the rear side of crankcase 60 is fixed to bracket 2m, and the lower portion of crankcase 60 is fixed to portion 2f of bracket 2e. Engine unit 10 is thereby supported by vehicle body frame 2.

As shown in FIG. 1 or 2, engine unit 10 is arranged below the rear portion of main frame 2b and in front of rear wheel 4. As shown in FIG. 3, engine unit 10 includes an engine 20, a continuously variable transmission 30, a clutch 80, crankcase 60 and a transmission case 50 housing continuously variable transmission 30.

Engine 20 includes a crankshaft 21, a cylinder 22 and a piston 23. Cylinder 22 is arranged in a position to be slightly slanted upward forward (in direction Fr of FIG. 3) of crankcase 60. When an air-fuel mixture sent into cylinder 22 combusts, piston 23 reciprocates in cylinder 22. Piston 23 is coupled to a crankpin 25 disposed in crankshaft 21 via a connecting rod 24. Reciprocating motion of piston 23 is converted to rotational motion by crankshaft 21 and is outputted to the downstream side of the transmission path of a driving force.

Crankshaft 21 extends in the vehicle width direction (direction W in FIG. 3) in crankcase 60. Crankshaft 21 includes a right shaft part 21a, a left shaft part 21b, and crank arms 21c, 21c extended in a radial direction from base portions of right shaft part 21a and left shaft part 21b and that support crankpin 25 rotatably.

Left shaft part 21b extends outward in the vehicle width direction (in a left direction with respect to a direction in which the vehicle travels) from its base portion. Left shaft part 21b has a generator mounted thereon. Right shaft part 21a extends outward in the vehicle width direction (in a right direction with respect to the direction in which the vehicle travels) from its base portion. Right shaft part 21a has driving side pulley 31 of continuously variable transmission 30 mounted thereon. End portion 21d of right shaft part 21a is supported by transmission case 50.

Figure 4:
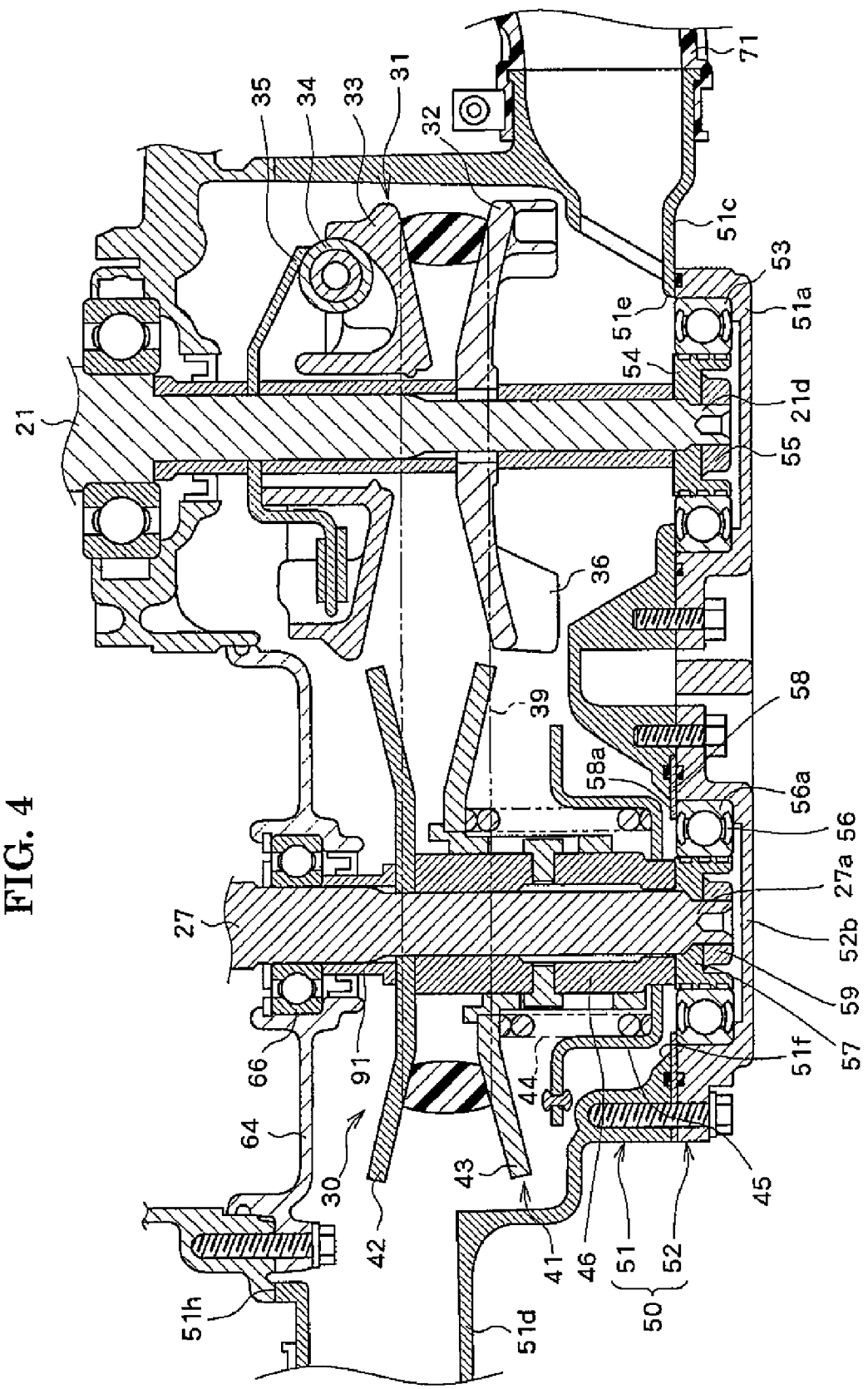
FIG. 4 is a sectional view of the continuously variable transmission and a transmission case.
Figure 5:
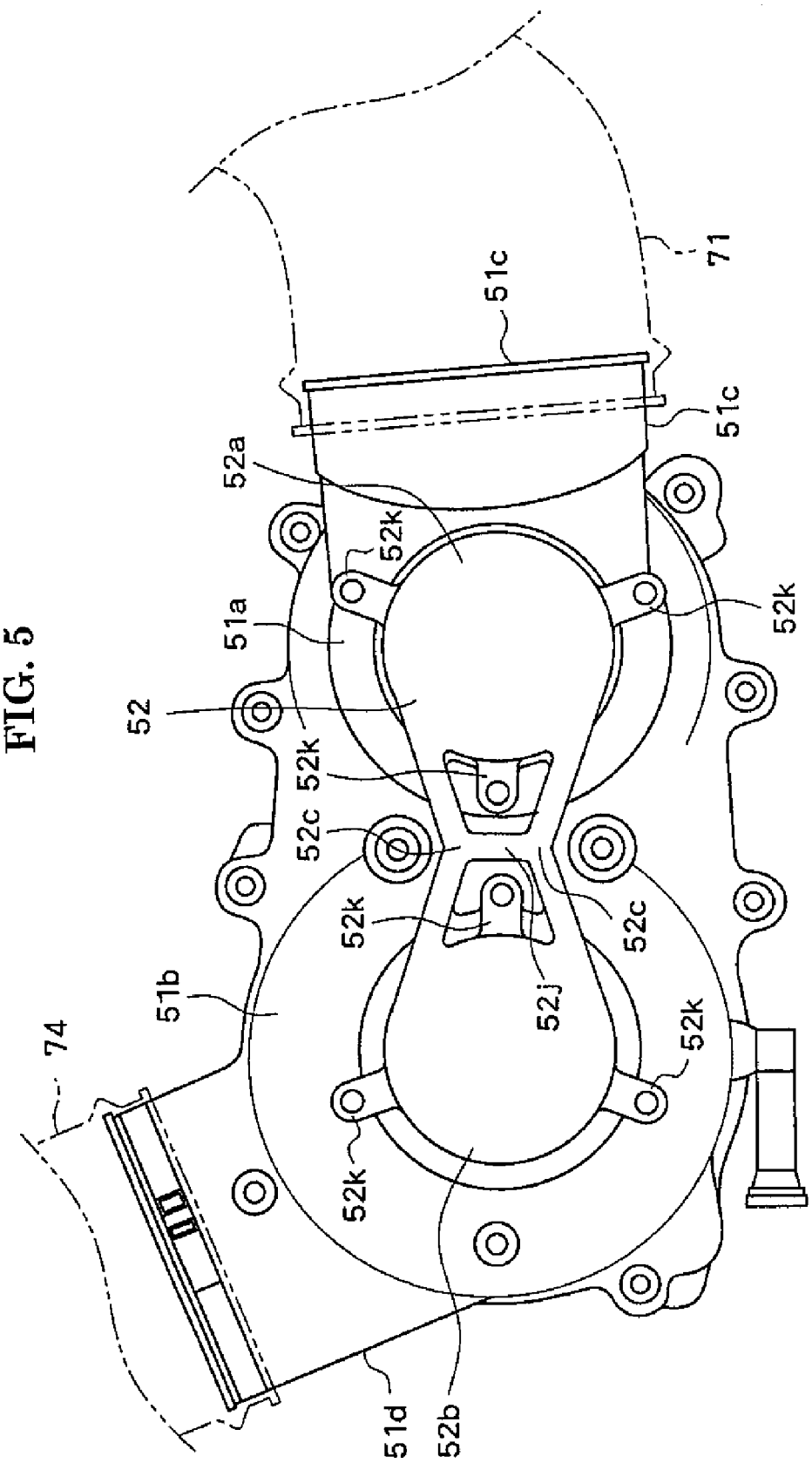
FIG. 5 is a side view of the transmission case.

FIG. 4 is a sectional view of continuously variable transmission 30 and transmission case 50. FIG. 5 is a side view of transmission case 50. In FIG. 4, transmission case 50 is formed in the shape of a cup opening inside in the vehicle width direction (toward the center in the vehicle width direction) and has a case body 51 and a support member 52 disposed therein. Case body 51 houses continuously variable transmission 30 and support member 52 is fixed to case body 51 from the outside. End portion 21d of crankshaft 21 protrudes in the axial direction from an opening 51e formed in the wall of the front portion of case body 51. Support member 52 has a drive shaft supporting portion 52a in its front portion and a driven shaft supporting portion 52b in its rear portion. Drive shaft supporting portion 52a supports end portion 21d of crankshaft 21. As shown in FIG. 4, drive shaft supporting portion 52a supports end portion 21d of crankshaft 21 via a bearing 53 and an annular member 54. That is, bearing 53 is fitted inside drive shaft supporting portion 52a, and annular member 54 rotated with the inner race of bearing 53 is arranged inside the inner race. Annular member 54 is fitted on end portion 21d of crankshaft 21 and is rotated with crankshaft 21. End portion 21d of crankshaft 21 has a nut 55 fitted thereon from outside annular member 54.

As shown in FIG. 3, a driven shaft 27 and an output shaft 29 are arranged at positions rearward separate from crankshaft 21. Driven shaft 27 extends in the vehicle width direction, and driven shaft 27 has a driven side pulley 41 of continuously variable transmission 30 and a clutch 80 mounted thereon. Driven side pulley 41 is positioned rearward of driving side pulley 31, and clutch 80 is arranged inside in the vehicle width direction of driven side pulley 41.

Driven shaft 27 has a bearing 65 and a bearing 63 fitted on its end portion 27b inside in the vehicle width direction. Bearing 63 is positioned outside in the vehicle width direction of bearing 65. The outer race of bearing 65 is supported by crankcase 60, and crankcase 60 supports end portion 27b of driven shaft 27 via bearing 65. Bearing 63 has output shaft 29 fitted on its outer race, and bearing 63 supports output shaft 29. Center portion 29a of output shaft 29 is supported by crankcase 60 via a bearing 62. Driven shaft 27 has a bearing 66 fitted on its center portion 27c. The outer race of bearing 66 is supported by a partition member 64 fixed to crankcase 60, and crankcase 60 supports center portion 27c of driven shaft 27 via partition member 64 and bearing 66. Partition member 64 is positioned between clutch 80 and driven side pulley 41 and closes a clutch chamber 60a formed in crankcase 60. Clutch 80 is housed in clutch chamber 60a. End portion 27a outside in the vehicle width direction of driven shaft 27 is supported by transmission case 50.

As shown in FIG. 4, end portion 27a of driven shaft 27 protrudes in the axial direction from an opening 51f formed in the wall of the front portion of case body 51 and is supported by driven shaft supporting portion 52b of support member 52. Driven shaft supporting portion 52b supports end portion 27a of driven shaft 27 via a bearing 56 and an annular member 57. That is, bearing 56 is fitted inside driven shaft supporting portion 52b. Annular member 57 is formed in the shape of a circular ring and is rotated with and arranged inside the inner race of bearing 56. Annular member 57 is fitted on end portion 27a of driven shaft 27 and is rotated with driven shaft 27. End portion 27a of driven shaft 27 has a nut 59 fitted thereon from outside annular member 57.

As shown in FIG. 4, case body 51 has a come-off preventing member 58 fixed to the edge of opening 51f thereof that prevents bearing 56 from dropping out inside in the vehicle width direction. Come-off preventing member 58 is, for example, a circular ring-shaped member and has a smaller inside diameter than the outside diameter of bearing 56. Edge 58a inside come-off preventing member 58 thereby sandwiches outer race 56a of bearing 56 between itself and driven shaft supporting portion 52b.

Further, as shown in FIG. 5, support member 52 has plural (six) fixing portions 52k formed thereon that protrude in a radial direction (a direction perpendicular to the center line of crankshaft 21 or driven shaft 27) from drive shaft supporting portion 52a and driven shaft supporting portion 52b. Fixing portions 52k are fixed to the outside wall of case body 51 with bolts.

As shown in FIG. 4 or FIG. 5, support member 52 includes a support column portion 52c that is bridged between drive shaft supporting portion 52a and driven shaft supporting portion 52b and that is thrust between them.

Continuously variable transmission 30 is now described. Continuously variable transmission 30 is a belt-type continuously variable transmission and, as described above, includes driving side pulley 31 and driven side pulley 41. Moreover, continuously variable transmission 30 has a belt 39 that is looped around driving side pulley 31 and driven side pulley 41 and that transmits torque from driving side pulley 31 to driven side pulley 41.

As shown in FIG. 4, driving side pulley 31 includes a fixed sheave 32, a movable sheave 33 and a plate 35. Fixed sheave 32 and plate 35 have their axial movements restricted, and movable sheave 33 can be moved in the axial direction between fixed sheave 32 and plate 35. Movable sheave 33 faces fixed sheave 32 in the axial direction, and the front side of belt 39 is wound around these parts.

A weight roller 34 moved in the radial direction by a centrifugal force is arranged between movable sheave 33 and plate 35. When crankshaft 21 is rotated, weight roller 34 is moved outside in the radial direction and presses movable sheave 33 to the fixed sheave 32 side. Then, belt 39 is pushed and moved forward by movable sheave 33, whereby the diameter of a portion around which belt 39 is wound of driving side pulley 31 is enlarged to reduce a speed reduction ratio.

Driving side pulley 31 includes a fan 36 for introducing outside air into transmission case 50. Fan 36 is erected outside in the vehicle width direction from fixed sheave 32. Case body 51 includes an intake port 51c for taking in outside air and an exhaust port 51d for exhausting air from transmission case 50 (FIG. 5). As shown in FIGS. 2 and 5, an air intake duct 71 that is slanted upward is connected to intake port 51c. Air intake duct 71 has an air cleaner 72 fixed to its tip. As shown in FIG. 2, a tip duct 73 protruded upward is fixed to the top portion of air cleaner 72. As shown in FIG. 2 or 5, an air exhaust duct 74 extended slantwise upward is connected to exhaust port 51d.

Figure 6:
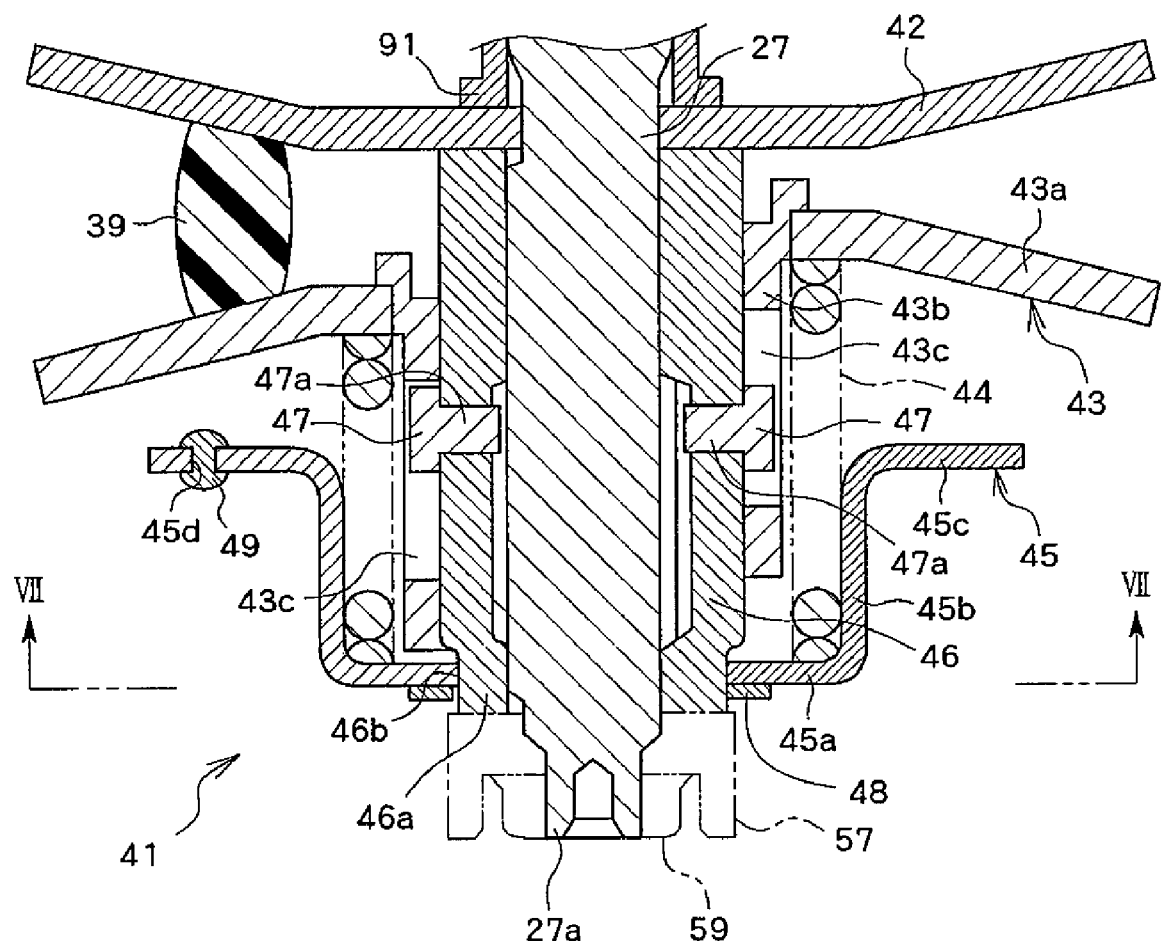
FIG. 6 is a sectional view of a driven side pulley along a plane passing through a position-of-center-of-gravity adjusting part fixed in the driven side pulley.

As shown in FIG. 4, driven side pulley 41 is mounted on driven shaft 27 and is rotated with driven shaft 27 by torque transmitted via belt 39. FIG. 6 is a sectional view of driven side pulley 41. As shown in FIG. 6, driven side pulley 41 includes a fixed sheave 42 rotated with driven shaft 27, a movable sheave 43 rotated with driven shaft 27 and a collar 46 for restricting axial movement of fixed sheave 42.

As shown in FIG. 4, driven shaft 27 has a collar 91, fixed sheave 42, and collar 46 fitted thereon. These parts are sandwiched by bearing 66 and annular member 57, thereby having their axial movements restricted. Moreover, collar 46 and fixed sheave 42 are coupled to driven shaft 27 by a spline, and these parts are integrally rotated.

Figure 7:
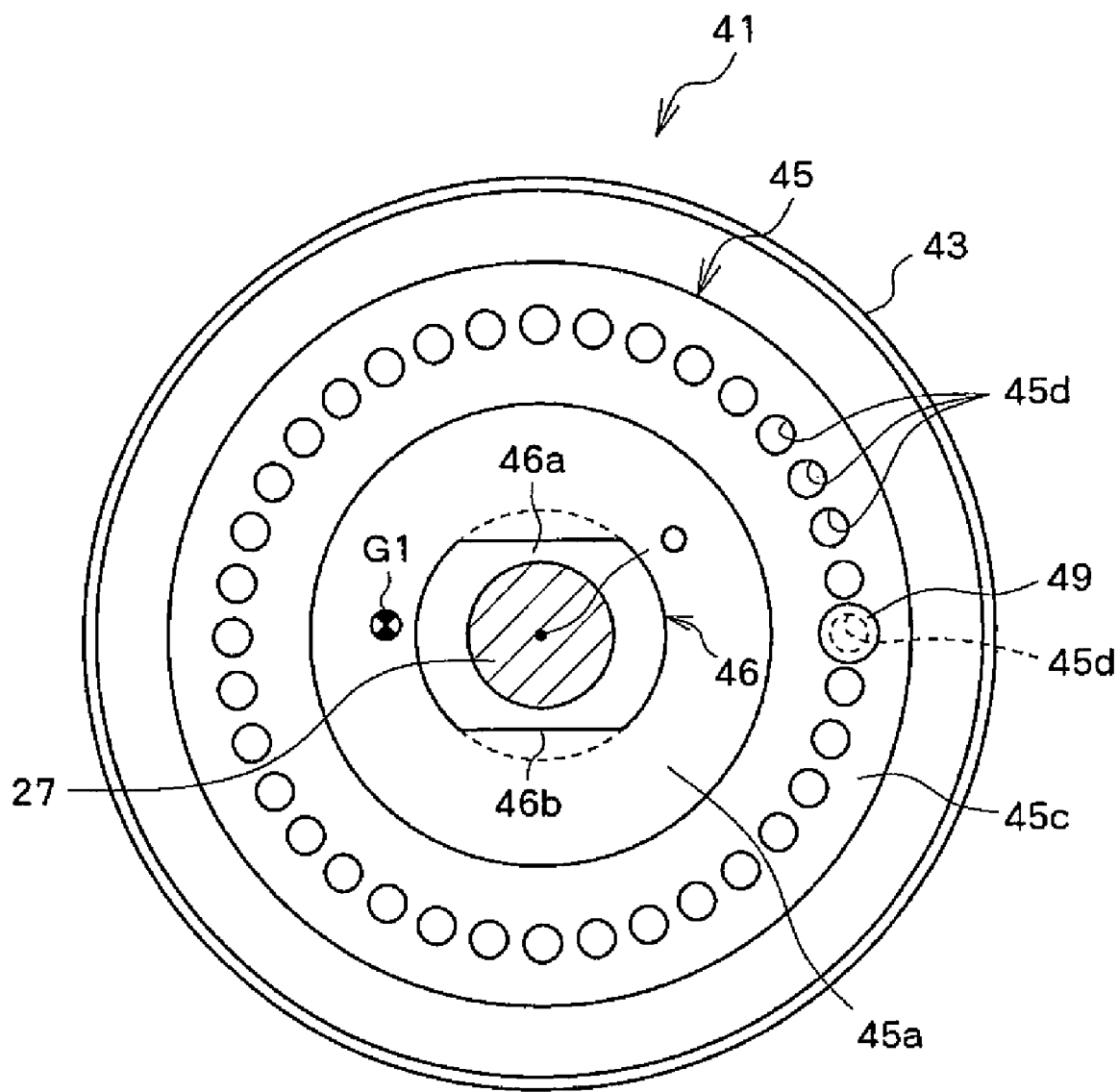
FIG. 7 is a sectional view taken along line VII-VII of FIG. 6.

As shown in FIG. 6, a spring supporting member 45 formed in the shape of a circular disk having its center depressed is fitted on end portion 46a outside in the vehicle width direction of collar 46. Spring supporting member 45 is positioned outside in the vehicle width direction of fixed sheave 42 and movable sheave 43 (on the end portion 27a side of driven shaft 27). Spring supporting member 45 is also fixed to and rotates with collar 46. FIG. 7 is a sectional view taken along line VII-VII of FIG. 6. A portion of the outer peripheral surface of end portion 46a of collar 46 formed in the shape of a circular cylinder is cut away to form a plane portion 46b on the outer peripheral surface thereof The inner peripheral edge of spring supporting member 45 is formed in the shape mated with the outside shape of end portion 46a. Spring supporting member 45 is thereby rotated with collar 46. End portion 46a of collar 46 has a clip 48 fixed thereto that is formed in the shape of a letter C and prevents spring supporting member 45 from dropping out.

As shown in FIG. 6, movable sheave 43 includes a sheave body 43a extended in the radial direction of driven shaft 27 and a cylindrical boss part 43b fitted on collar 46. Boss part 43b has a spring 44 fitted thereon that biases movable sheave 43 to the fixed sheave 42 side. The end portion of spring 44 abuts against spring supporting member 45, and spring 44 is pressed onto fixed sheave 42 side by spring supporting member 45.

Boss part 43b has guide grooves 43c, 43c formed therein that extend in the axial direction. Keys 47, 47 having their tip portions 47a inserted into collar 46 are arranged in guide grooves 43c, 43c. Rotation of movable sheave 43 is thereby transmitted to collar 46 via keys 47, 47, and movable sheave 43 is moved in the axial direction by the guide of keys 47, 47. Guide grooves 43c, 43c of boss part 43b are formed on sides opposite to each other across the center line of driven shaft 27.

The rear side of belt 39 is looped around sheave body 43a of movable sheave 43 and around fixed sheave 42. When belt 39 is pushed forward by movable sheave 33 in driving side pulley 31, movable sheave 43 is moved in a direction separate from fixed sheave 42 against the biasing force of spring 44 in driven side pulley 41. The diameter of a portion of belt 39 that is wound around driven side pulley 41 thereby becomes smaller and hence a speed reduction ratio becomes smaller.

The position of the center of gravity of driven side pulley 41 may be shifted from the center of rotation (center line O of driven shaft 27) by a manufacture error or the like. For this reason, in this embodiment, a position-of-center-of-gravity adjusting part 49 for bringing the position of the center of gravity of driven side pulley 41 close to the center of rotation thereof is disposed at a position separate from the center line of driven shaft 27 in spring supporting member 45.

As shown in FIG. 6, spring supporting member 45 includes an inner peripheral portion 45a extending in the radial direction from the outer peripheral surface of collar 46, a cylindrical portion 45b erected to the fixed sheave 42 side from the edge of inner peripheral portion 45a, and an outer peripheral portion 45c extending in the radial direction from the edge of cylindrical portion 46b. Outer peripheral portion 45c has plural holes 45d formed to pass through outer peripheral portion 45c. As shown in FIG. 7, holes 45d are formed at equal intervals in the circumferential direction in outer peripheral portion 45c.

Position-of-center-of-gravity adjusting part 49 is, for example, a rivet. Position-of-center-of-gravity adjusting part 49 is fitted in hole 45d positioned on the opposite side across driven shaft 27 with respect to a direction in which the position of the center of gravity is shifted from the center of rotation of driven side pulley 41. As shown in FIG. 7, when the position of the center of gravity G1 of spring supporting member 45, fixed sheave 42, movable sheave 43, collar 46 and spring 44 (that is, parts except for position-of-center-of-gravity adjusting part 49 in driven side pulley 41) is not on center line O of driven shaft 27, position-of-center-of-gravity adjusting part 49 is fitted in hole 45d positioned on the side opposite to the position of the center of gravity G1 across center line O. The mass of position-of-center-of-gravity adjusting part 49 is set according to the amount of shift from center line O of the position of the center of gravity G1 (the distance between the position of center of gravity G1 and center line O, and the mass of the parts except for position-of-center-of-gravity adjusting part 49 in driven side pulley 41). Here, plural position-of-center-of-gravity adjusting parts 49 may be fitted according to the amount of shift from center line O of the position of center of gravity G1.

Holes 45d are formed, for example, in the step of manufacturing spring supporting member 45. The position at which position-of-center-of-gravity adjusting part 49 is fitted and the mass of position-of-center-of-gravity adjusting part 49 is computed by measuring the amount of shift from the center of rotation of the position of the center of gravity of spring supporting member 45, fixed sheave 42, movable sheave 43, collar 46 and spring 44 in a state where these parts are mounted on driven shaft 27 and by measuring a direction in which the position of the center of gravity of these parts is shifted in the state. Position-of-center-of-gravity adjusting part 49 of the mass computed in this manner is then fitted in hole 45d at a position computed in this manner. For this reason, position-of-center-of-gravity adjusting part 49 is formed after the respective members constructing driven side pulley 41 such as spring supporting member 45 and fixed sheave 42 are combined. In other words, the position of center of gravity G1 and the amount of shift of the position of center of gravity G1 are measured in a state where respective members such as fixed sheave 42 are combined. Then, driven side pulley 41 has a rivet as position-of-center-of-gravity adjusting part 49 fixed thereto at a position corresponding to the position of center of gravity G1, the rivet having mass corresponding to the amount of shift of the position of center of gravity G1.

As shown in FIG. 4, spring 44 is pressed onto the fixed sheave 42 side by inner peripheral portion 45a of spring supporting member 45. Moreover, a portion positioned outside in the vehicle width direction in spring 44 is housed inside cylindrical portion 45b.

Figure 8:
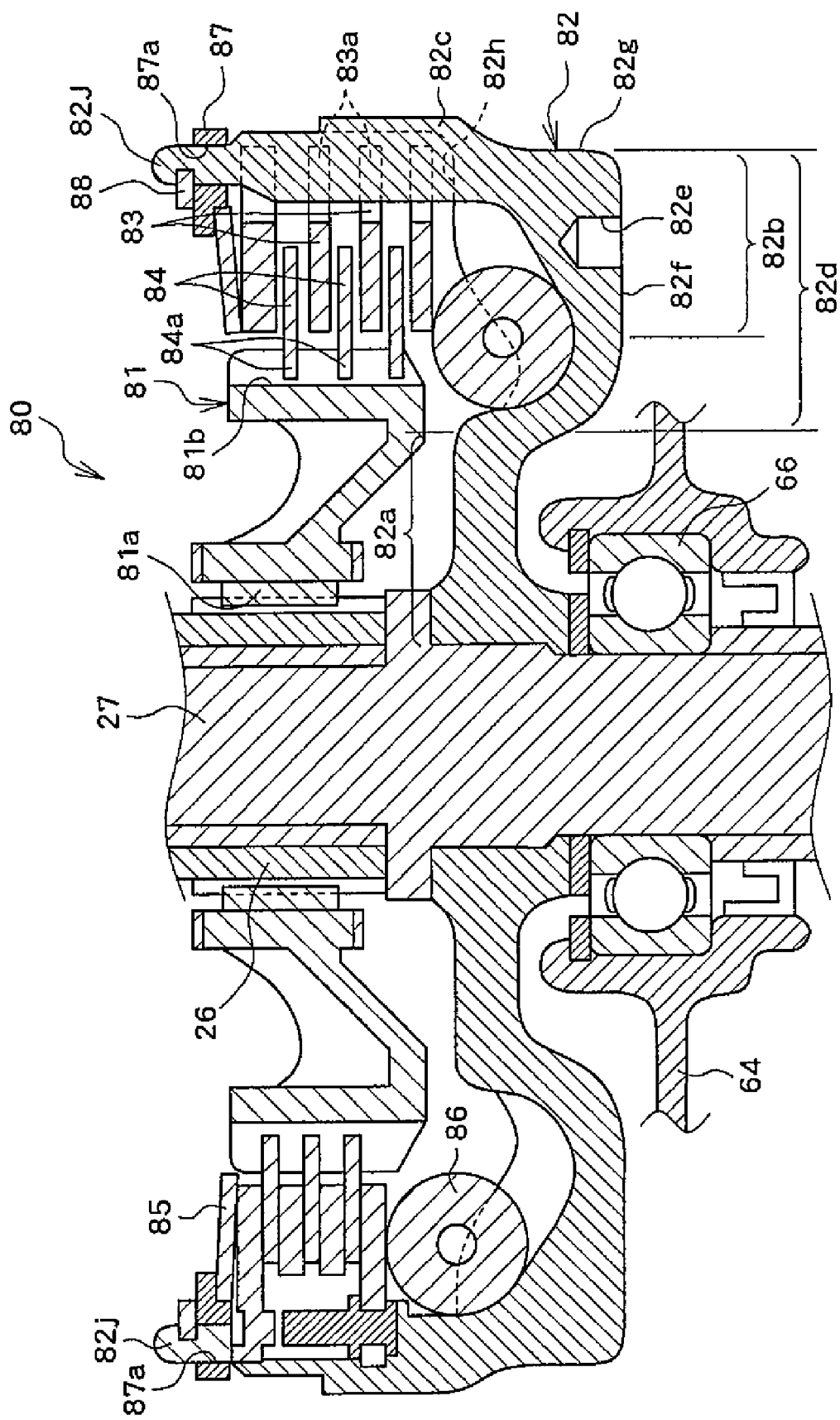
FIG. 8 is a sectional view of the clutch along a plane passing through a position-of-center-of-gravity adjusting portion formed in the clutch.

Clutch 80 is now described. FIG. 8 is a sectional view of clutch 80. As described above, clutch 80 is disposed on the side opposite to driven side pulley 41 across center portion 27c of driven shaft 27 (FIG. 3). Clutch 80 includes a clutch inner 81 idling with respect to driven shaft 27 and a clutch outer 82 having a larger mass than clutch inner 81 and rotating with driven shaft 27. Clutch 80 is a multiple disc clutch and includes plural friction plates 83 rotating with clutch outer 82 and plural clutch plates 84 rotating with clutch inner 81. Clutch inner 81, friction plates 83 and clutch plates 84 are housed in clutch outer 82. Friction plate 83 has a mass larger than clutch plate 84.

Clutch outer 82 is a cylindrical member having its outside end in the vehicle width direction closed and includes an inner peripheral portion 82a extended in the radial direction from the outer peripheral surface of driven shaft 27, an outer peripheral portion 82b that is further extended in the radial direction from the outer peripheral edge of inner peripheral portion 82a and that is slightly bulged in the axial direction of driven shaft 27, and a cylindrical portion 82c erected in the axial direction from the edge of outer peripheral portion 82b. Inner peripheral portion 82a has a gear formed on its inner peripheral surface that is engaged with a gear formed on the outer peripheral surface of driven shaft 27. Cylindrical portion 82c has a guide groove 82h that extends in the axial direction formed on its inner peripheral surface. A protrusion 83a is formed on friction plate 83 and protrudes in the radial direction and is fitted in guide groove 82h. Protrusion 83a is guided by guide groove 82h and hence friction plate 83 is moved in the axial direction. Moreover, protrusion 83a is engaged with guide groove 82h and hence friction plate 83 rotates with clutch outer 82.

Clutch inner 81 is arranged inside cylindrical portion 82c of clutch outer 82. Driven shaft 27 has a gear 26 fitted therein that idles with respect to driven shaft 27. Clutch inner 81 has a gear 81a formed on its inner peripheral surface that is engaged with gear 26, Clutch inner 81 rotates with gear 26. Clutch inner 81 has a guide groove 81b formed on its outer peripheral surface that extends in the axial direction. Clutch plate 84 has a protrusion 84a formed on its inner peripheral edge that protrudes inside in the radial direction and is fitted in guide groove 81b. Protrusion 84a is guided by guide groove 81b and hence clutch plate 84 is moved in the axial direction. Protrusion 84a is engaged with guide groove 81b and hence clutch inner 81 is rotated with clutch plate 84.

Friction plates 83 and clutch plates 84 are alternately arranged and are pressed onto each other and are moved in association with each other, whereby torque is transmitted from friction plates 83 to clutch plates 84. In the example shown in FIG. 8, clutch 80 is an automatic clutch, and the connection or interruption of clutch 80 is automatically performed according to the rotation speed of driven shaft 27. Specifically, clutch 80 includes a weight roller 86 that is rotated around driven shaft 27 along with clutch outer 82, and a diaphragm spring 85 that biases friction plates 83 in the axial direction. Friction plates 83 and clutch plates 84 are arranged between weight roller 86 and diaphragm spring 85. When clutch outer 82 is rotated, weight roller 86 is moved in the radial direction by a centrifugal force to press friction plates 83 onto clutch plates 84. Clutch 80 is thereby brought into a connection state. Moreover, when the rotation speed of driven shaft 27 is decreased, weight roller 86 is returned inside in the radial direction (to the driven shaft 27 side) and hence friction plates 83 are separated from clutch plates 84, whereby clutch plate 80 is brought into an interruption state.

An annular stopper 87 is arranged at a position opposite to outer peripheral portion 82b and inner peripheral portion 82a across friction plates 83 and clutch plates 84. Cylindrical portion 82c of clutch outer 82 has a protrusion 82j protruding in the axial direction of clutch 80 formed thereon. Protrusion 82j has annular stopper 87 fitted thereon. Annular stopper 87 prevents friction plates 83 and diaphragm spring 85 from coming off from clutch outer 82. Annular stopper 87 has plural holes 87a formed therein that have protrusion 82j fitted therein. An annular clip 88 for preventing annular stopper 87 from coming off is fitted on the inner peripheral surface of protrusion 82j.

There is a case where the position of the center of gravity of clutch 80 is shifted from the center of rotation (center line of driven shaft 27) by a manufacture error and the like. For this reason, a position-of-center-of-gravity adjusting portion 82e for bringing the position of the center of gravity of clutch 80 close to its center of rotation is formed at a position separate from the center line of driven shaft 27 in clutch outer 82. A thick portion 82d that is thicker than the other portion of clutch outer 82 is formed at a position outside in the radial direction of outer peripheral portion 82b (direction perpendicular to the center line of driven shaft 27). A hole as position-of-center-of-gravity adjusting portion 82e is formed in a surface 82f outside in the vehicle width direction of thick portion 82d.

Figure 9:
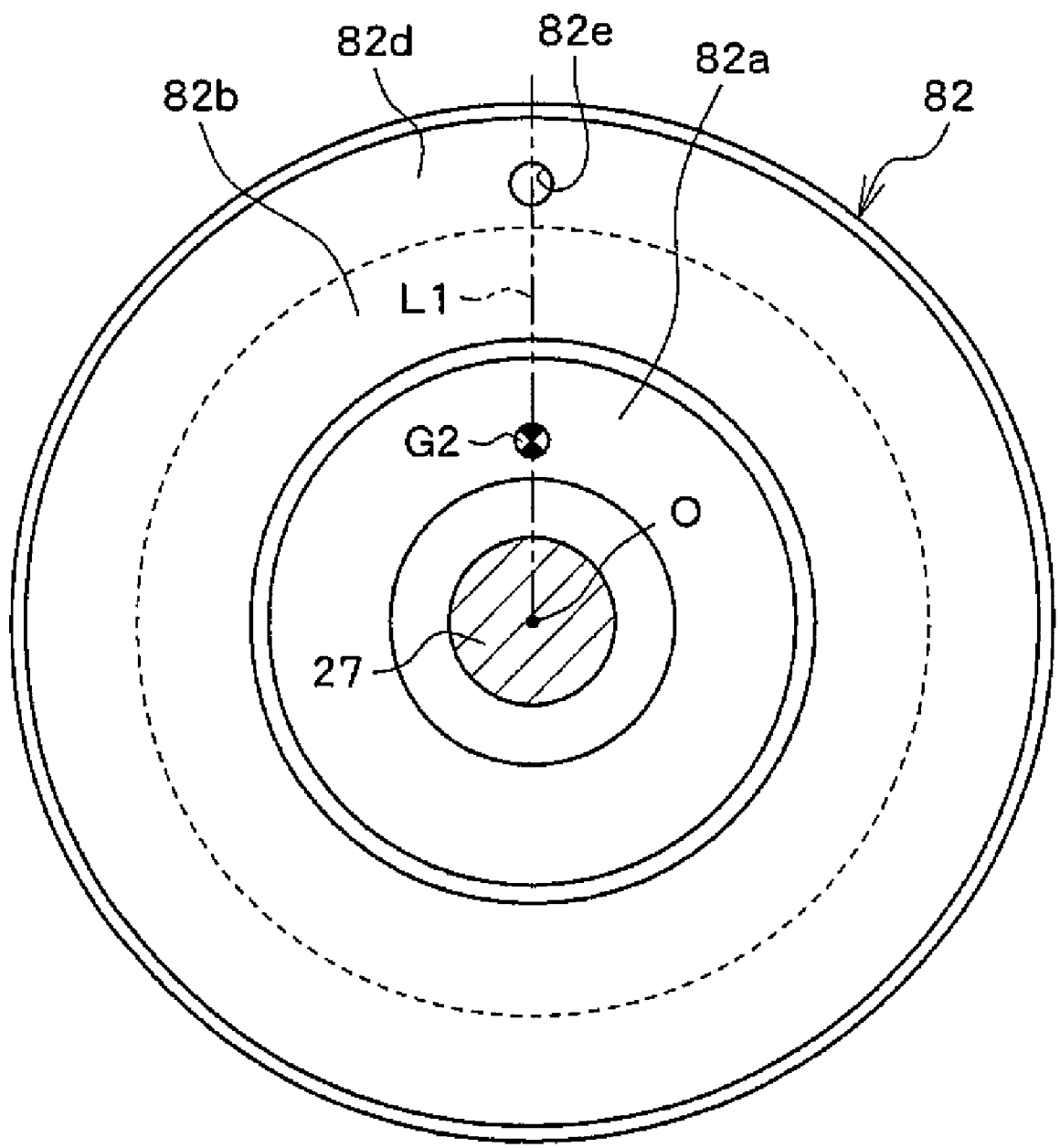
FIG. 9 is a view in an axial direction of a clutch outer of the clutch.

FIG. 9 is a view in the axial direction of clutch outer 82. As shown in FIG. 9, thick portion 82d is formed on the entire periphery of outer peripheral portion 82b and is in the shape of a circular ring surrounding driven shaft 27. As shown in FIG. 8, thick portion 82d is formed in such a way that its thickness becomes larger toward the outside in the radial direction.

Position-of-center-of-gravity adjusting portion 82e is formed on the same side as a direction in which the position of the center of gravity of clutch 80 is shifted from the center of rotation of clutch 80 in thick portion 82d. As shown in FIG. 9, when the position of center of gravity G2 of the whole of clutch 80 (that is, clutch outer 82, friction plate 83, clutch plate 84 and clutch inner 81) before formation of position-of-center-of-gravity adjusting portion 82e is not on a center line O of driven shaft 27, position-of-center-of-gravity adjusting portion 82e is formed at a position on an extension line L1 connecting center line O and the position of center of gravity G2. Moreover, the size (diameter and depth of the hole) of position-of-center-of-gravity adjusting portion 82e is set according to the amount of shift from center line O of the position of center of gravity G2 (distance between the position of center of gravity G2 and center line O and the mass of clutch 80). Here, plural position-of-center-or-gravity adjusting portions 82e may be formed according to the amount of shift from center line O of the position of center of gravity G2. Position-of-center-of-gravity adjusting portion 82e is formed on surface 82f outside in the vehicle width direction of thick portion 82d, but position-of-center-of-gravity adjusting portion 82e may be formed, for example, on an outer peripheral surface 82g of thick portion 82d. Position-of-center-of-gravity adjusting portion 82e is formed after the respective members constructing clutch 80 such as clutch outer 82 and friction plate 83 are combined. In other words, the position of center of gravity G2 and the amount of shift from center line O of the position of center of gravity G2 are measured in a state where respective members such as clutch outer 82 are combined. A hole is formed as position-of-center-of-gravity adjusting portion 82e in thick portion 82d of clutch outer 82 to reduce the amount of shift.

The transmission path of a driving force in engine unit 10 is now described. Rotation of crankshaft 21 is reduced by continuously variable transmission 30 and is transmitted to driven shaft 27. Rotation of driven shaft 27 is transmitted to clutch outer 82 of clutch 80. When clutch 80 is in the connection state, rotation of driven shaft 27 is transmitted from clutch outer 82 to clutch inner 81 and then is transmitted from clutch inner 81 to gear 26. Gear 26, as shown in FIG. 3, is engaged with a gear 28a of an intermediate shaft 28 arranged forward of driven shaft 27. Moreover, intermediate shaft 28 has a gear 28b formed thereon and gear 28b is engaged with a gear 29b formed on output shaft 29. Rotation of gear 26 is thereby transmitted to output shaft 29 via intermediate shaft 28. Output shaft 29 has a sprocket 29c mounted thereon, sprocket 29c having a chain wound around itself. The chain is wound around also a sprocket) rotated with rear wheel 4 and hence rotation of output shaft 29 is transmitted to rear wheel 4 via the chain.

According to clutch 80 described above, position-of-center-of-gravity adjusting portion 82e is formed in thick portion 82d having a large thickness and hence a part that is used for bringing the position of center of gravity G2 of clutch 80 close to the center of rotation is increased, so that even when the position of center of gravity G2 is greatly shifted from the center of rotation, the clutch itself does not need to be replaced and the efficiency of manufacture work is enhanced.

Moreover, thick portion 82d has a hole formed therein as position-of-center-of-gravity adjusting portion 82e. For this reason, the accuracy of adjusting the position of the center of gravity is increased. That is, the position of the center of gravity can be finely adjusted by adjusting the depth, the diameter, and the position of the hole.

Further, in clutch 80, clutch outer 82 includes inner peripheral portion 82a extended in the radial direction from the outer peripheral surface of driven shaft 27 and outer peripheral portion 82b further extended in the radial direction from inner peripheral portion 82a, and thick portion 82d is formed in outer peripheral portion 82b. For this reason, the position of center of gravity G2 of clutch 80 can be displaced to center line O side the by small manufacture as compared with a case where the thick portion is formed in the inner peripheral portion.

Still further, according to continuously variable transmission 30 described above, spring supporting member 45 having position-of-center-of-gravity adjusting part 49 fitted therein is positioned on the outside in the vehicle width direction of fixed sheave 42 and movable sheave 43, that is, on the side close to a worker. For this reason, the work of bringing the position of center of gravity G1 close to the center of rotation can is easily performed even in the state where fixed sheave 42 and movable sheave 43 are mounted on driven shaft 27.

Still further, in continuously variable transmission 30, position-of-center-of-gravity adjusting part 49 is fitted in spring supporting member 45 that sandwiches spring 44 between itself and movable sheave 43 and that presses spring 44 onto the movable sheave 43 side. For this reason, this eliminates the need for providing driven side pulley 41 with an exclusive rotary member to dispose position-of-center-of-gravity adjusting part 49, which enhances the productivity of continuously variable transmission 30.

Still further, in continuously variable transmission 30, spring supporting member 45 includes inner peripheral portion 45*a* that abuts against the end portion of spring 44 and that presses spring 44 onto the movable sheave 43 side and outer peripheral portion 45*c* that is positioned outside in the radial direction of inner peripheral portion 45*a*. Position-of-center-of-gravity adjusting part 49 is fitted in outer peripheral portion 45*c* of spring supporting member 45. For this reason, the position of center of gravity G2 of driven side pulley 41 of continuously variable transmission 30 can be displaced to center line O side by small manufacture, for example, as compared with a case where position-of-center-of-gravity adjusting part 49 is fitted in inner peripheral portion 45*a*.

Still further, in continuously variable transmission 30, position-of-center-of-gravity adjusting part 49 is a rivet. For this reason, the work of bringing the position of center of gravity G1 close to the center of rotation is easily performed even in the state where fixed sheave 42 and movable sheave 43 are mounted on driven shaft 27.

Still further, in continuously variable transmission 30, position-of-center-of-gravity adjusting part 49 is fitted in spring supporting member 45. For this reason, the work of bringing the position of center of gravity G1 close to the center of rotation is easily performed, for example, as compared with a case where the position of the center of gravity of movable sheave 43 and fixed sheave 42 is adjusted by cutting away a portion of spring supporting member 45. Moreover, the occurrence of metal powder or the like that occurs when spring supporting member 45 is cut away is prevented.

Figure 10:
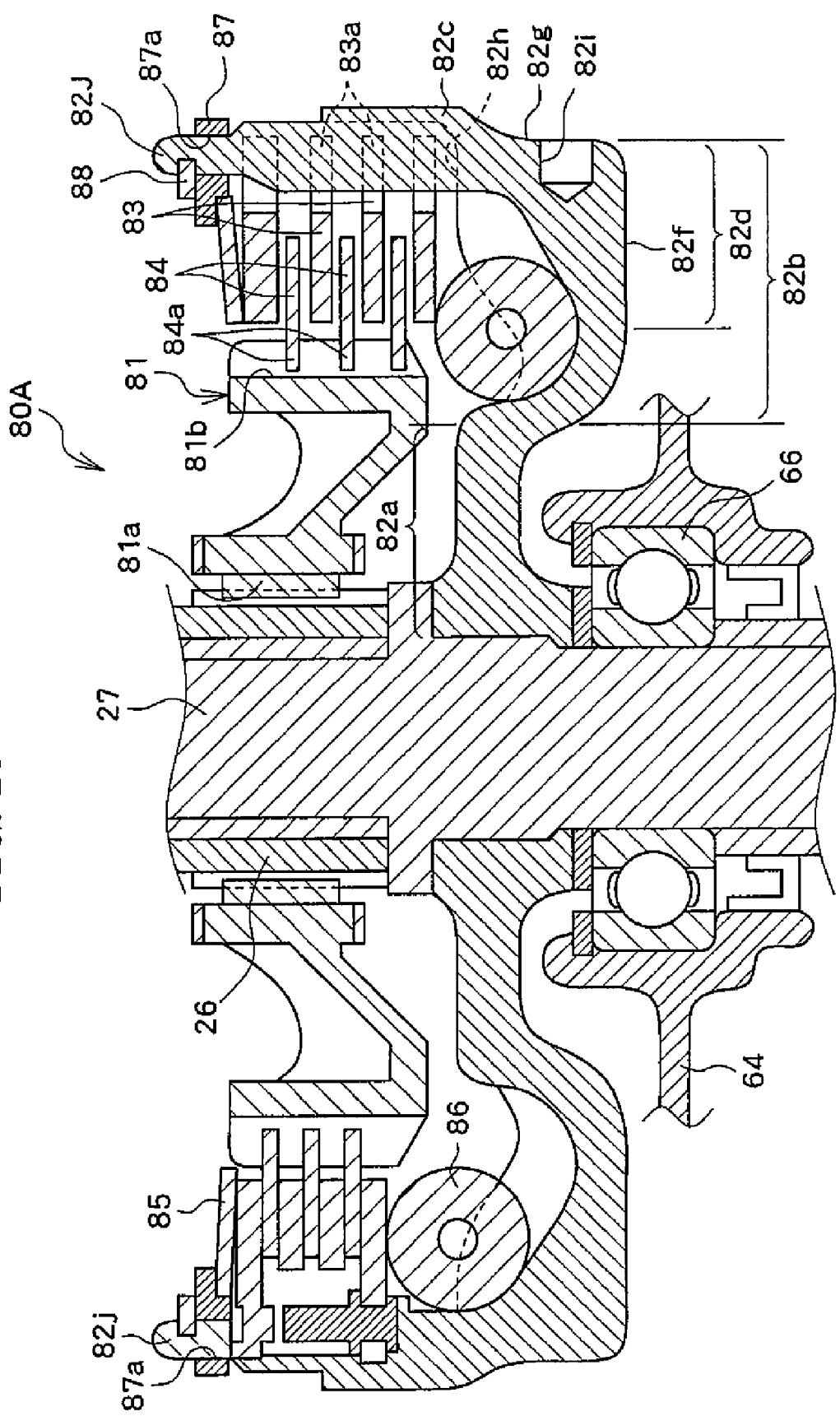
FIG. 10 is a sectional view of a clutch according to another embodiment of the present invention.

The present invention is not limited to clutch 80 and continuously variable transmission 30 that have been described above but can be variously modified. For example, in clutch 80, thick portion 82*d* is formed on outer peripheral portion 82*b*, but thick portion 82*d* may instead be formed on cylindrical portion 82*c*. In other words, the thickness of cylindrical portion 82*c* may be made larger. Moreover, the hole as position-of-center-of-gravity adjusting portion 82*e* may pass through outer peripheral portion 82*b* in the axial direction of driven shaft 27. Moreover, in clutch 80, position-of-center-of-gravity adjusting portion 82*e* is formed in surface 82*f* outside in the vehicle width direction of thick portion 82*d*, but as described above, position-of-center-of-gravity adjusting portion 82*e* may be formed in outer peripheral surface 82*g* of thick portion 82*d*. FIG. 10 is a section view of a clutch 80A according to this embodiment. In clutch 80A, a hole is formed as a position-of-center-of-gravity adjusting portion 82*i* in outer peripheral surface 82*g* of thick portion 82*d*. The position of position-of-center-of-gravity adjusting portion 82*i* in a peripheral direction, like position-of-center-of-gravity adjusting portion 82*e*, is a position on an extension line connecting the position of the center of gravity of clutch 80A in a state where position-of-center-of-gravity adjusting portion 82*i* is not formed and center line O passes through the rotational center of clutch 80A.

Figure 11:
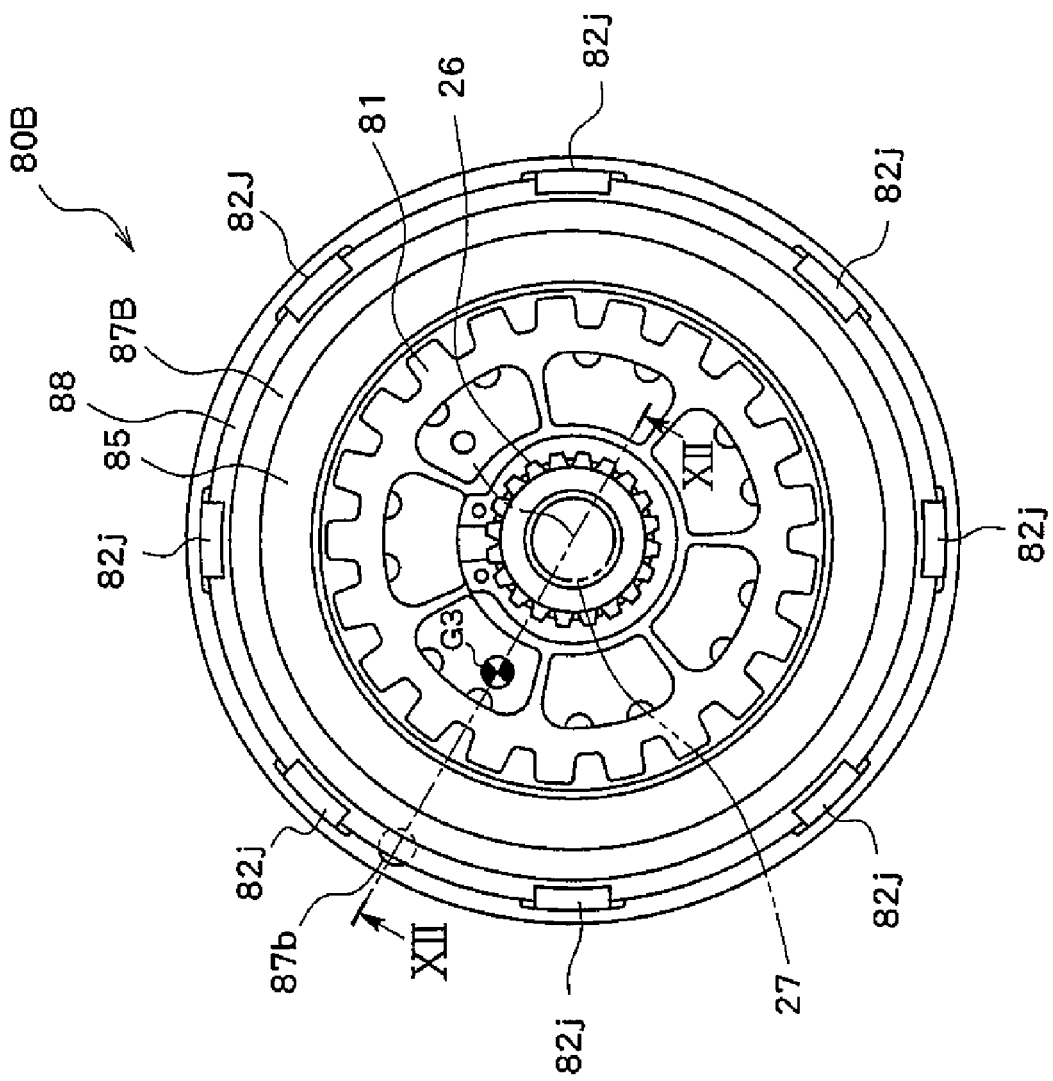
FIG. 11 is a view of a clutch according to another embodiment of the present invention in the axial direction of a driven shaft and a view of the clutch from a center side in a vehicle width direction.
Figure 12:
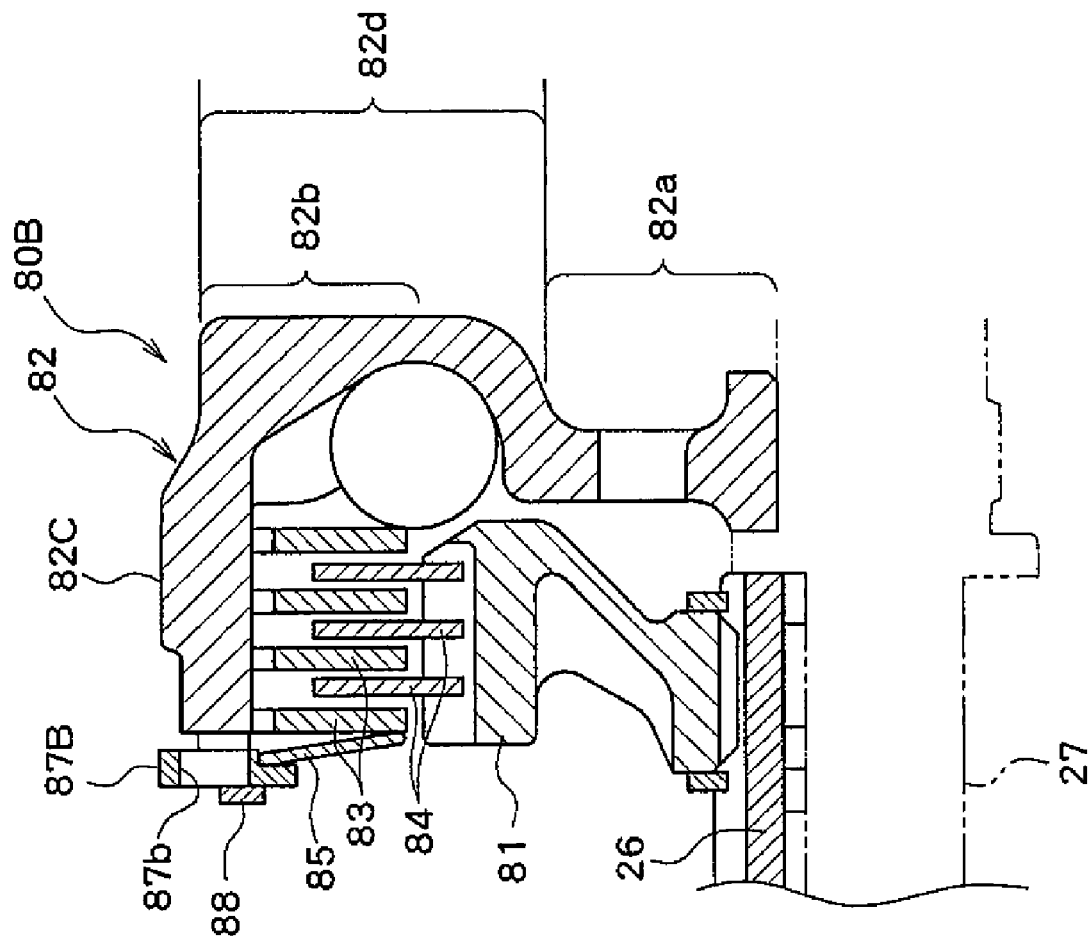
FIG. 12 is a sectional view taken along line XII-XII of FIG. 11.
Figure 13:
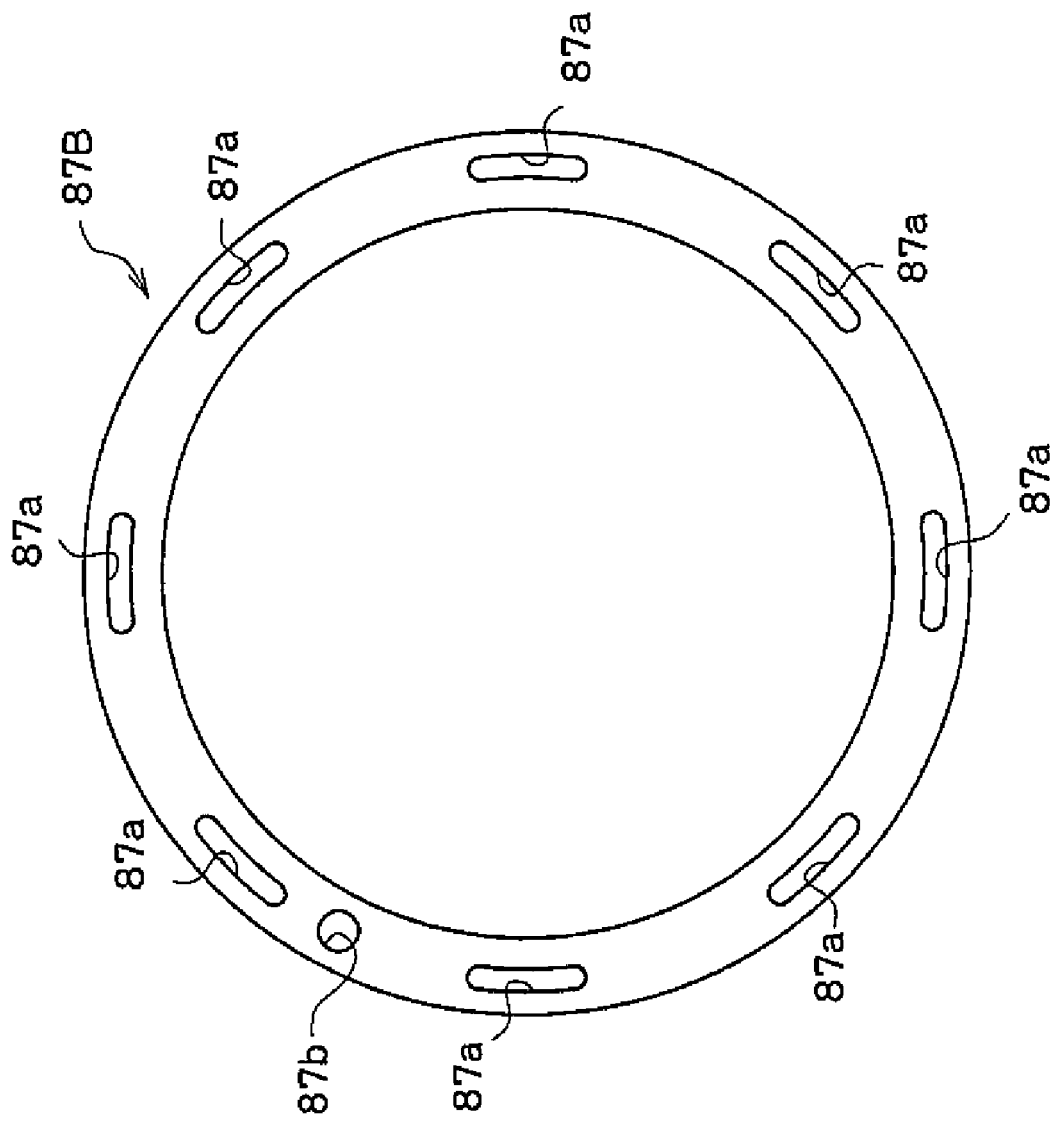
FIG. 13 is a front view of an annular stopper of the clutch of FIGS. 11 and 12.

Moreover, the clutch may have a hole formed in annular stopper 87 thereof as a position-of-center-of-gravity adjusting portion, in place of position-of-center-of-gravity adjusting portions 82*i*, 82*e* formed in clutch outer 82 or in addition to position-of-center-of-gravity adjusting portions 82*i*, 82*e*. FIG. 11 is a diagram when a clutch 80B according to this embodiment is viewed in the axial direction of driven shaft 27 and is a diagram when clutch 80B is viewed from the center side in the vehicle width direction. FIG. 12 is a section view taken along line XII-XII of FIG. 11. FIG. 13 is a front view of an annular stopper 87B fixed to clutch 80B. In FIG. 11 and, the same portions as those described above are denoted by the same reference symbols.

As shown in FIGS. 11-13, annular stopper 87B has a hole formed therein as a position-of-center-of-gravity adjusting portion 87*b*. The position of position-of-center-of-gravity adjusting portion 87*b* in the peripheral direction of annular stopper 87B, like the above-mentioned position-of-center-of-gravity adjusting portions 82*e*, 82*i*, is a position on an extension line connecting the position of center of gravity G3 of clutch 80B in a state where position-of-center-of-gravity adjusting portion 87*b* is not formed and center line O passing through the rotational center of clutch 80B. The size (diameter of the hole) of position-of-center-of-gravity adjusting portion 87*b* is set according to the amount of shift from center line O of the position of center of gravity G3. Plural holes 87*a* formed at equal intervals in the peripheral direction are shown in FIG. 13. As described above, protrusion 82*j* of clutch outer 82 is fitted in hole 87*a* (see FIG. 8). Position-of-center-of-gravity adjusting portion 87*b* is positioned between holes 87*a*.

Figure 14:
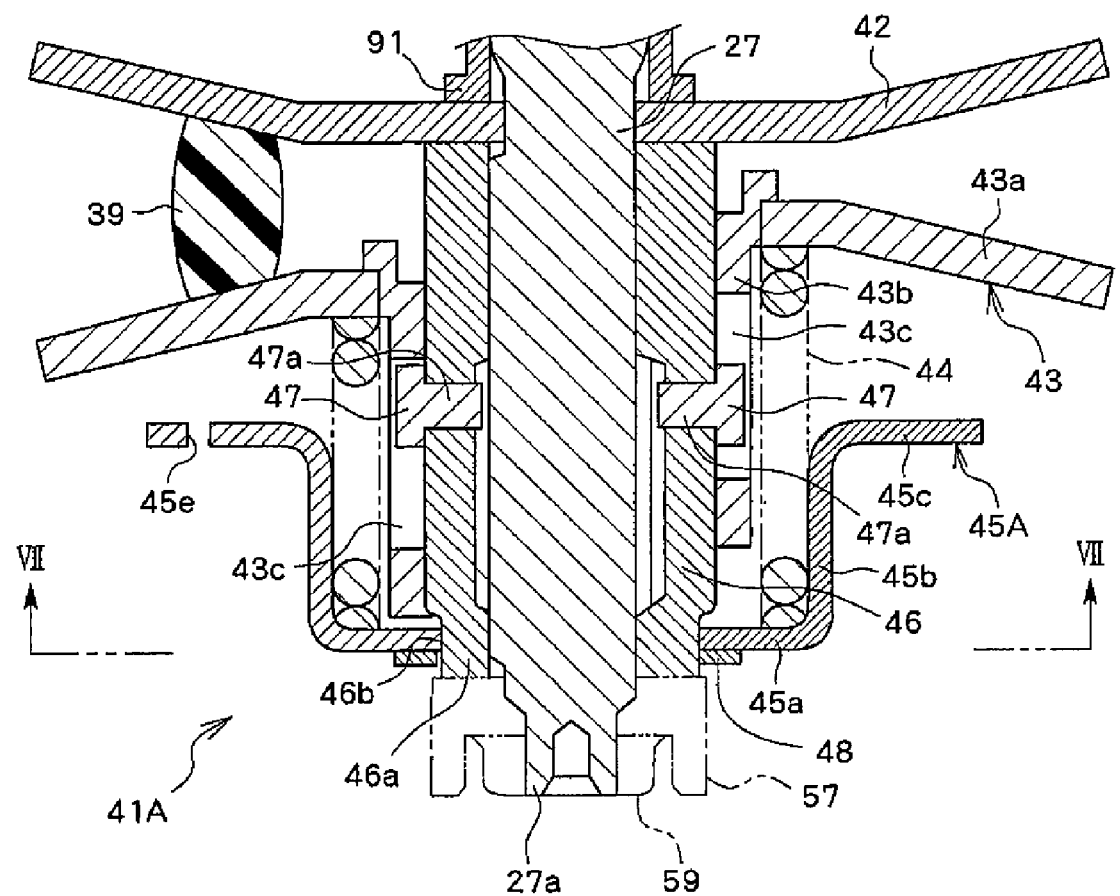
FIG. 14 is a sectional view of a driven side pulley according to another embodiment of the present invention.
Figure 15:
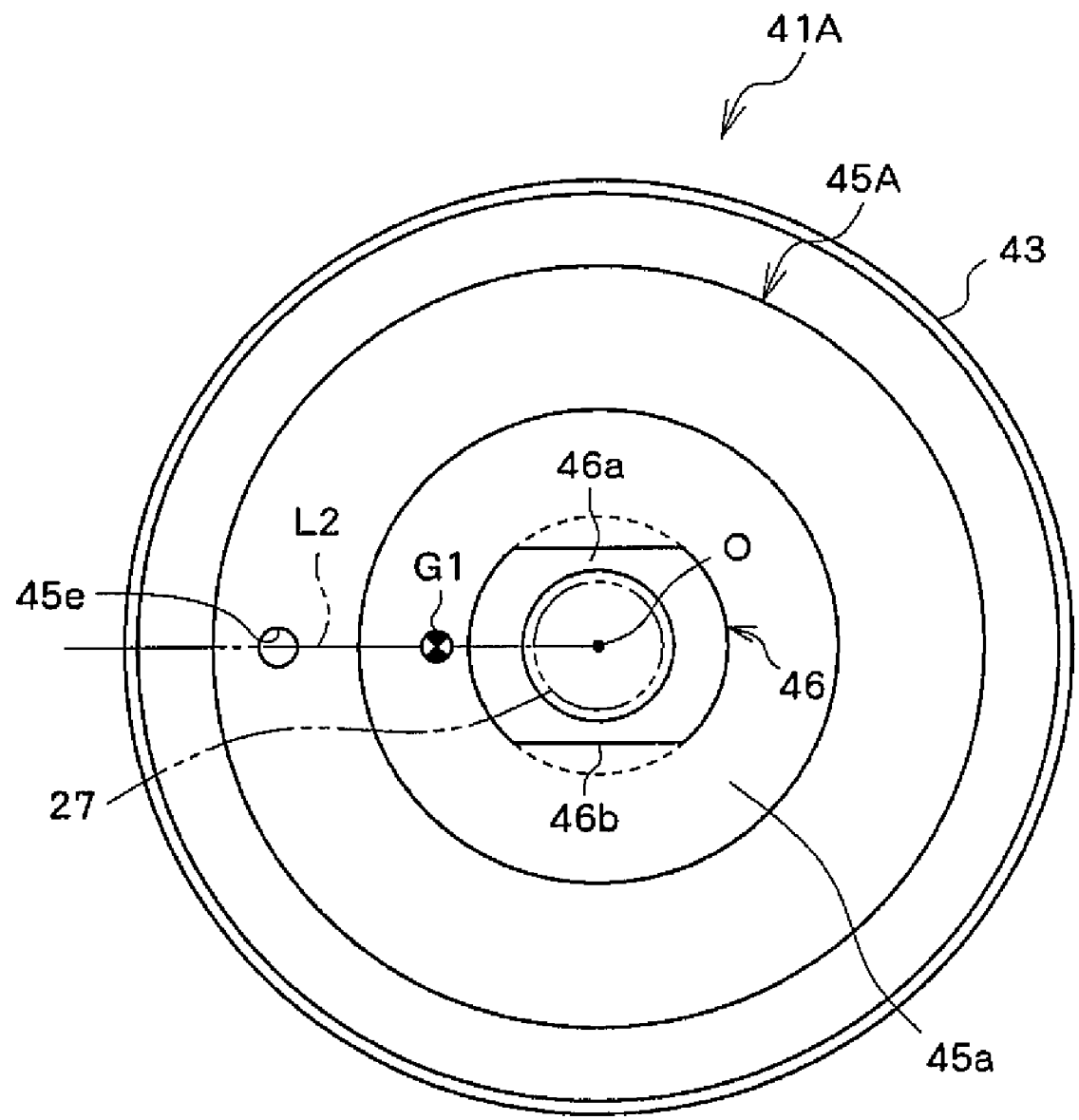
FIG. 15 is a view of the driven side pulley of FIG. 14 in an axial direction.

Moreover, in the above description, driven side pulley 41 has a rivet fixed thereto as position-of-center-of-gravity adjusting part 49. However, driven side pulley 41 may have a hole formed therein as the position-of-center-of-gravity adjusting portion in place of the rivet. FIG. 14 is a sectional view of a driven side pulley 41A in this embodiment. FIG. 15 is a diagram obtained when driven side pulley 41A is viewed in the axial direction. As shown in the drawings, in driven side pulley 41A, a spring supporting member 45A has a hole formed therein as a position-of-center-of-gravity adjusting portion 45*e*. The position of position-of-center-of-gravity adjusting portion 45*e* in the peripheral direction is opposite to position-of-center-of-gravity adjusting part 49 and is on a line L2 extended from center line O toward the position of center of gravity G1 in a state where the respective members constructing driven side pulley 41 are combined. In driven side pulley 41A, holes 45*d* positioned at equal intervals in the peripheral direction are not formed, which is different from driven side pulley 41.

Further, in the above description, clutch 80 is an automatic multiple disc clutch including plural friction plates 83 and clutch plates 84. However, the clutch may be an automatic centrifugal clutch of the type in which a weight having a friction plate is moved outward in the radial direction by a centrifugal force and hence is pressed onto the inner peripheral surface of the clutch outer to transmit torque.

Still further, in continuously variable transmission 30, position-of-center-of-gravity adjusting part 49 is fitted in spring supporting member 45. However, an exclusive member may be provided that rotates with movable sheave 43 and fixed sheave 42 and that has position-of-center-of-gravity adjusting part 49 fitted therein.

The invention claimed is:

1. A clutch comprising:
   a clutch inner mounted to be rotated around a shaft;
   a clutch outer mounted to be rotated around the shaft and that houses the clutch inner and that transmits or interrupts torque between the clutch outer and the clutch inner, wherein the clutch outer includes a flat outer surface extending in a radial direction outward from an outer peripheral surface of the shaft, the clutch outer includes a thick portion formed therein that has a larger thickness than other portions of the clutch outer and becomes thicker as the thick portion extends outwardly in the radial direction, the clutch outer includes a position-of-center-of-gravity adjusting portion formed in the flat outer surface and the thick portion at a position separate from an axial center of the shaft to bring a center of gravity of the clutch close to the axial center of the shaft, the position-of-center-of-gravity adjusting portion includes a hole extending in a direction parallel to the axial center of the shaft, the clutch outer includes a plurality of friction plates and the clutch inner includes a plurality of clutch plates, and the hole overlaps with the plurality of friction plates of the clutch outer in the direction parallel to the axial center of the shaft.

2. The clutch according to claim 1, wherein the clutch outer includes an inner peripheral portion extending in the radial direction from the outer peripheral surface of the shaft and an outer peripheral portion further extending outward in the radial direction from the inner peripheral portion, and the thick portion is formed in the outer peripheral portion.

3. An engine unit including the clutch according to claim 1.

* * * * *